(12) United States Patent  (10) Patent No.: US 7,270,545 B2
Milner  (45) Date of Patent: Sep. 18, 2007

(54) MOTORCYCLE WHEELIE SIMULATOR

(75) Inventor: Dori Milner, 11344 Lake Katherine Cir., Clermont, FL (US) 34711

(73) Assignee: Dori Milner, Clermont, FL (US)

( * ) Notice: Subject to any disclaimer, the term of this patent is extended or adjusted under 35 U.S.C. 154(b) by 435 days.

(21) Appl. No.: 10/870,261

(22) Filed: Jun. 18, 2004

(65) Prior Publication Data

US 2005/0175968 A1    Aug. 11, 2005

(51) Int. Cl.
*G09B 9/04* (2006.01)
(52) U.S. Cl. .............................. 434/61; 434/67; 434/70
(58) Field of Classification Search .................. 434/29, 434/54, 61, 64–69, 71; 472/105, 135
See application file for complete search history.

(56) References Cited

U.S. PATENT DOCUMENTS

| | | | | |
|---|---|---|---|---|
| 3,526,042 A | * | 9/1970 | Nelson | 434/61 |
| 3,686,776 A | * | 8/1972 | Dahl | 434/61 |
| 3,964,564 A | * | 6/1976 | Pittarelli | 180/219 |
| 4,049,262 A | * | 9/1977 | Cunningham, Jr. | 472/135 |
| 4,887,967 A | * | 12/1989 | Letovsky et al. | 434/61 |
| 4,978,300 A | * | 12/1990 | Letovsky et al. | 434/61 |
| 5,006,072 A | * | 4/1991 | Letovsky et al. | 434/61 |
| 5,076,792 A | * | 12/1991 | Niermann | 434/61 |
| 5,209,662 A | * | 5/1993 | Fujita et al. | 434/61 |
| 5,240,417 A | * | 8/1993 | Smithson et al. | 434/61 |
| 5,364,271 A | * | 11/1994 | Aknin et al. | 434/61 |
| 5,415,550 A | * | 5/1995 | Aoki et al. | 434/61 |
| 5,533,899 A | * | 7/1996 | Young | 434/61 |
| 5,547,382 A | * | 8/1996 | Yamasaki et al. | 434/61 |
| 6,234,800 B1 | * | 5/2001 | Koyama et al. | 434/61 |
| 6,471,586 B1 | * | 10/2002 | Aiki et al. | 463/6 |
| 6,733,294 B2 | * | 5/2004 | Tuluie et al. | 434/61 |
| 2002/0055422 A1 | * | 5/2002 | Airmet et al. | 482/61 |

FOREIGN PATENT DOCUMENTS

EP    0791907    *  3/1997

* cited by examiner

*Primary Examiner*—John M. Hotaling, II
*Assistant Examiner*—Travis R. Banta
(74) *Attorney, Agent, or Firm*—Dori Milner

(57) ABSTRACT

An apparatus for performing realistic motorcycle stunts while stationary includes a motorcycle, a restraint bracket, a road simulation means, a failsafe mechanism frame savers, an exhaust vent system, and safety protection. The restraint bracket comprises a bracket system for the attachment of the motorcycle to the apparatus. The road simulation means comprises an apparatus such as a 900 lb. Barrel that spins on two pivot points creating 100% balance under the rear wheel or front wheel of the motorcycle for "popping a wheelie" or performing an "endo" that can simulate actual road conditions. The failsafe mechanism frame savers comprises a series of sensors in electronic communication with the restraint bracket and road simulation means to ensure that the motorcycle does not roll over on one side or pitch back too far. The exhaust vent system comprises a tubular system in fluid communication with the motorcycle exhaust for venting exhaust gasses away from the proximity of the apparatus, the operator and any bystanders. The safety protection comprises general personal safety gear and a series of pads and nets located in areas around the apparatus to protect riders should they fall from the apparatus.

20 Claims, 25 Drawing Sheets

RIDE IN WHEELIE POSITION

RIDE IN NORMAL POSITION

RIDE IN WHEELIE POSITION

RIDE IN ENDO POSITION

WHEELIE RIDE BRACKET ASSEMBLY

WHEELIE RIDE BRACKET ASSEMBLY

ENLARGED VIEW OF TUBE FRAME BRACKET

ENLARGED VIEW OF AXLE ADJUSTER SLEEVE

ENLARGED VIEW OF ADJUSTER PLATES

ENLARGED VIEW OF AXLE

WHEELIE RIDE BRACKET ASSEMBLY

ENLARGED VIEW OF TUBE FRAME BRACKET

ADJUSTER SLEEVE

ENLARGED VIEW OF AXLE BOLT

ENLARGED VIEW OF BRACE ARM

ENLARGED VEIW OF BRACE BASE PLATE

BACK VIEW

RIDE IN NORMAL POSITION

FRAME SAVER ASSEMBLY VIEWS
FAILSAFE MECHANISM

SECURE PISTON STOP
TO FRAME WITH BOLT

FRAME SAVER ASSEMBLY VIEWS
FAILSAFE MECHANISM

PUSH PISTON THRU SLEEVE
AS SHOWN IN ILLUSTRATION

FRAME SAVER ASSEMBLY VIEWS
FAILSAFE MECHANISM

SCREW PLASTIC GUARD
INTO THE END OF PISTON

FRAME SAVER ASSEMBLY VIEWS
FAILSAFE MECHANISM

INSERT SPRING INTO
BACK OF PISTON

FRAME SAVER ASSEMBLY VIEWS
FAILSAFE MECHANISM

PUSH ASSEMBLY OVER PISTON STOP

FRAME SAVER ASSEMBLY VIEWS
FAILSAFE MECHANISM

ALIGN SET SCREW HOLES
AND TIGHTEN SET SCREWS

FRAME SAVER ASSEMBLY VIEWS
FAILSAFE MECHANISM

DRIVE COMPONENTS FOR HYDRAULIC RIDE

DRIVE COMPONENTS FOR PNEUMATIC RIDE

DRIVE COMPONENTS FOR ELECTRIC RIDE

MOTORCYCLE WHEELIE SIMULATOR

FIELD OF THE INVENTION

The subject invention pertains to an apparatus for motorcycle simulation and more specifically for simulating the performance of a wheelie.

BACKGROUND OF THE INVENTION

Every year thousands of motorcycle riders are injured or killed while attempting to perform tricks while riding. One of the most popular tricks that riders attempt is the wheelie. Wheelies occur when the front wheel of the motorcycle comes off of the ground and the motorcycle ride solely on its rear wheel. Wheelies are performed by sudden increases of force being applied to the rear wheel combined with ample wheel traction and sufficient balance. This is often done by increasing the throttle and/or suddenly, releasing the clutch.

Riders lacking the requisite skill to perform such a trick can easily lose balance, by falling to either side or by giving the motorcycle too much throttle and rotating the motorcycle over backwards.

With such danger involved in performing such extreme tricks, it is much safer to simulate such a stunt rather than attempt it on the street. Apparatus for the simulation of motorcycle riding are well known in the art; however, the drawbacks to the aforementioned devices include a lack of realism inasmuch as the rider does not truly experiences the wheelie over and above a simulation apparatus increasing its cycle of attack thus leaving the rider with a rather benign experience. The following describes an apparatus for simulating a wheelie that utilizes a real motorcycle operating under its own power to create a wheelie while stationary on a road simulation means. The apparatus further provides a safer venue for attempting such motorcycle tricks.

All documents and publications cited are incorporated by reference herein to the extent they are not inconsistent with the explicit teachings set forth in this disclosure.

BRIEF SUMMARY OF THE INVENTION

An apparatus for performing realistic motorcycle stunts while stationary includes a motorcycle, a restraint bracket, a road simulation means, a failsafe mechanism, an exhaust vent system, safety protection, and a control unit. The restraint bracket comprises a bracket system for the attachment of the motorcycle to the apparatus. The bracket system inputs sufficient structural strength to the apparatus for adequate performance under strenuous operating conditions. The road simulation means comprises an apparatus such as a dynamometer that can simulate actual road conditions. The road simulation means is in contact with the rear wheel of the motorcycle and comprises sufficient friction to keep the rear wheel or front wheel from slipping. The failsafe mechanism comprises a series of sensors in electronic communication with the restraint bracket and road simulation means to ensure that the motorcycle does not roll over on one side or pitch back too far. The exhaust vent system comprises a tubular system in fluid communication with the motorcycle exhaust for venting exhaust gasses away from the proximity of the apparatus, the operator and any bystanders. The safety protection comprises general personal safety gear and a series of pads and nets located in areas around the apparatus to protect riders should they fall from the apparatus. The control unit comprises a processor in electronic communication with all sensors and electronically operated devices on the apparatus. The control unit receives signals and input from these devices and interprets the signals and maintains appropriate conditions for the simulation.

Accordingly, it is an object of the present invention to provide an apparatus for simulating a stationary motorcycle ride.

It is a further object of the present invention to provide an apparatus for simulating the performance of motorcycle tricks.

It is a still further object of the present invention to provide an apparatus for simulating the performance of wheelies on a motorcycle.

Additional objects and advantages of the present invention will become apparent by reference to the following description of the preferred embodiment and appended drawings wherein like reference numbers refer to the same feature, component, or element.

BRIEF DESCRIPTION OF THE DRAWINGS

All of the following reference and illustrate an elevational view of the apparatus according to the present invention.

DESCRIPTION OF THE PREFERRED EMBODIMENT

Figure 1:
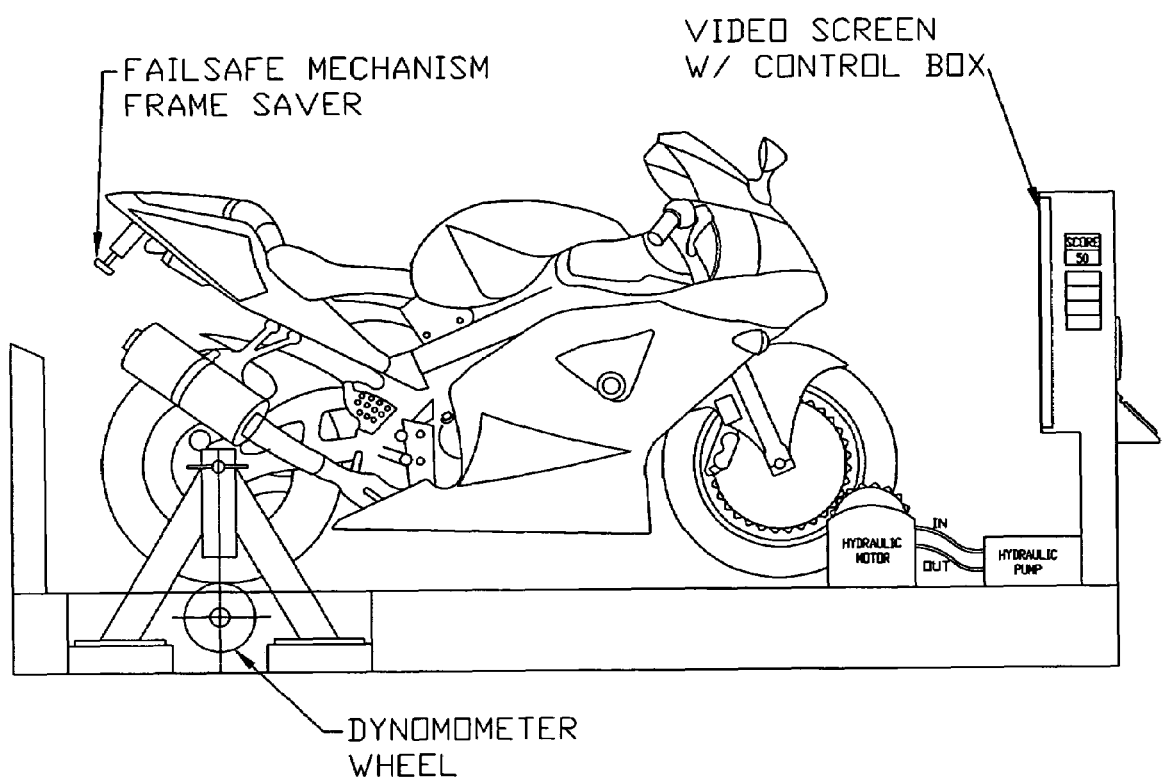
"FIG. 1 is an elevational side-view illustration of the apparatus according to the present invention.
Figure 2:
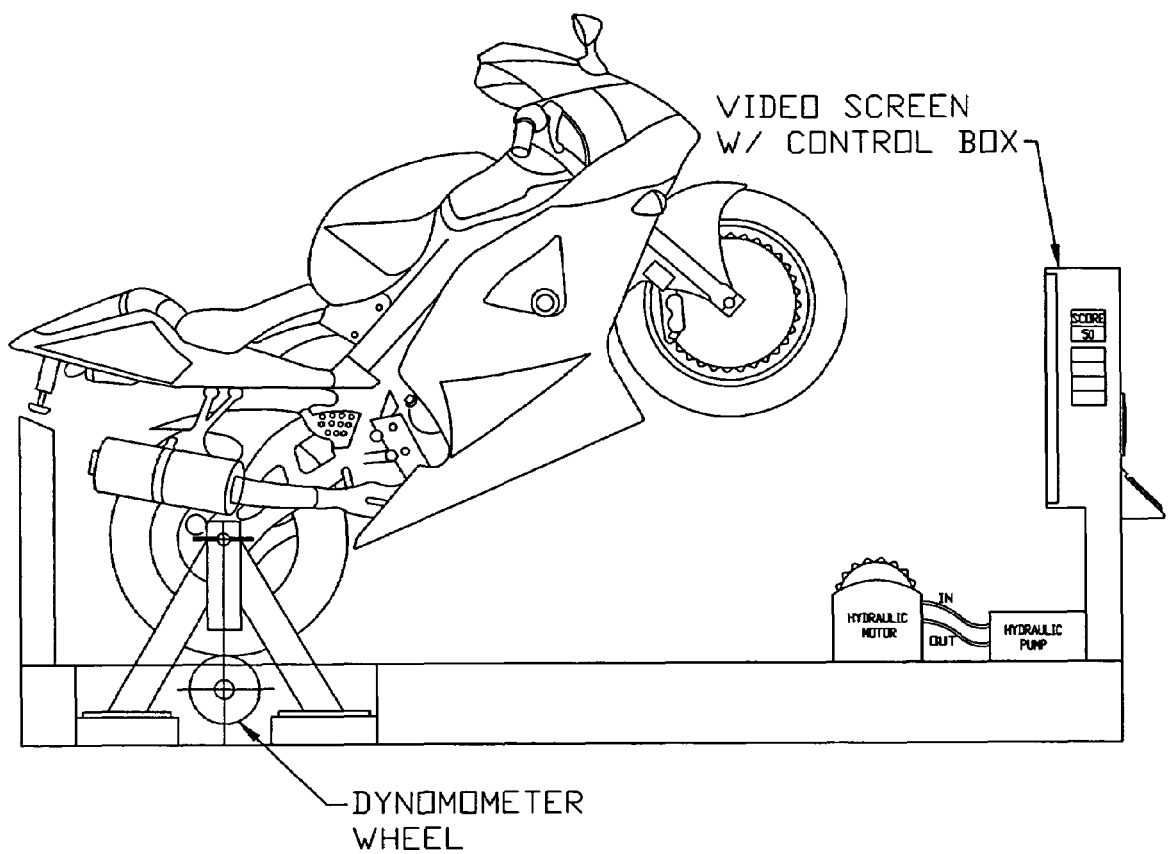
FIG. 2 is an elevational side-view illustration of an alternative embodiment of the apparatus according to the present invention.
Figure 3:
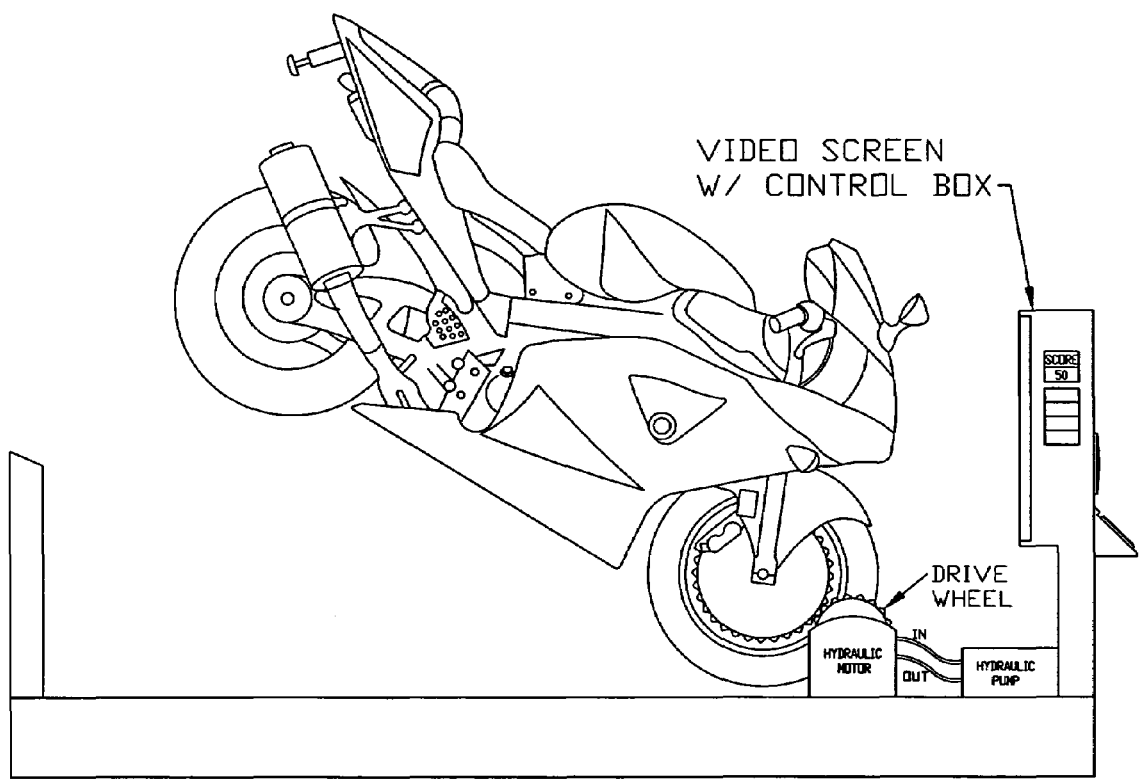
FIG. 3 is an elevational side-view illustration of an alternative embodiment of the apparatus recording to the present invention illustrating an "endo".

Referring now to FIG. 1, FIG. 2, FIG. 3, a motorcycle wheelie simulator apparatus according to the present invention is illustrated and generally designated by the reference name "apparatus".

Figure 5:
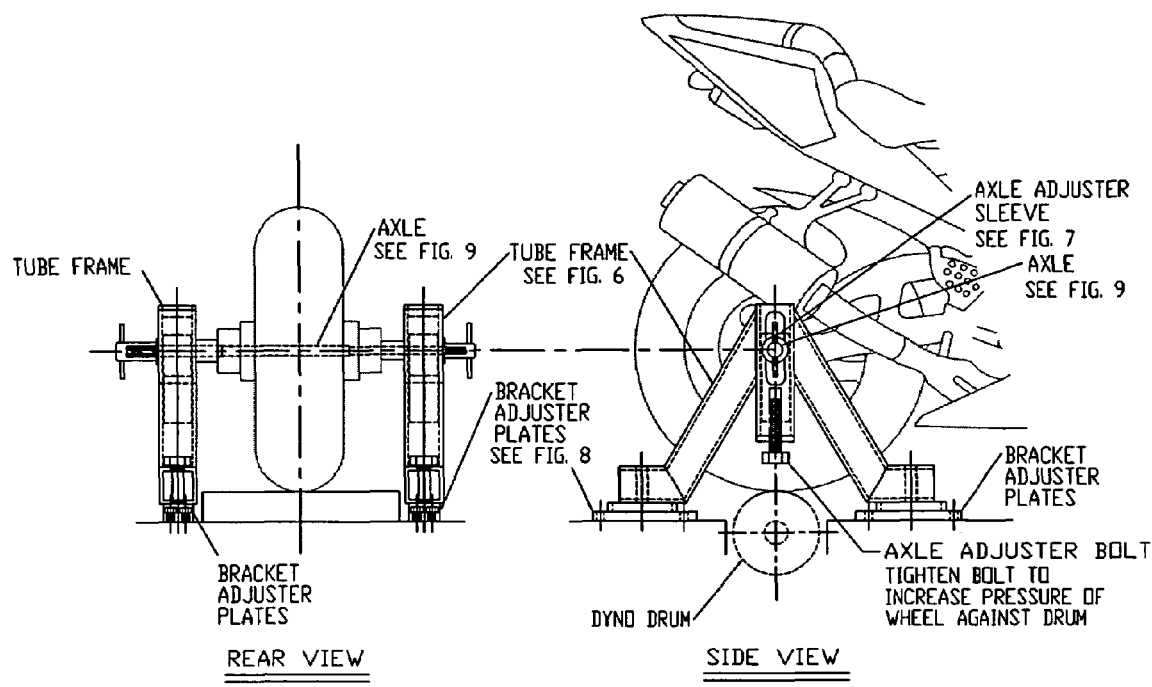
FIG. 5 is an elevational side and rear-view illustration of the bracket assembly according to the present invention.
Figure 6:
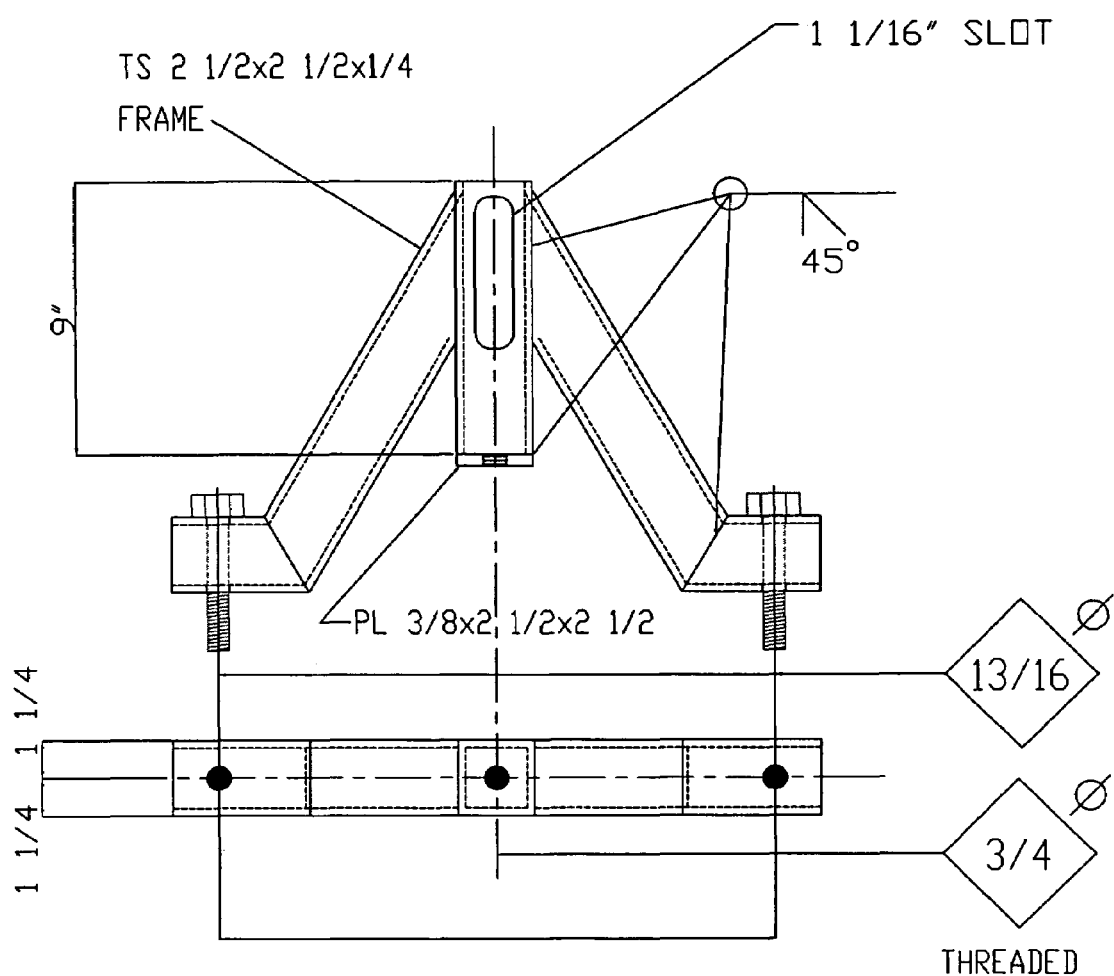
FIG. 6 is an elevational side-view illustration of the tube frame bracket according to the present invention.

The apparatus generally includes a motorcycle, a restraint bracket tube frame FIG. 6, a road simulation means, a failsafe safety protection system FIG. 1, FIG. 16, FIG. 17, FIG. 18, FIG. 19, FIG. 20, FIG. 21 and FIG. 22. The motorcycle can be any type of motorcycle with sufficient torque to be capable of performing a wheelie. Such motorcycle nonexclusively include: sport bikes; cruisers; touring motorcycles; standard motorcycles; choppers; dual-sport motorcycles; enduro motorcycles; dirt bikes; mini-bikes, three wheelers, four wheelers, ATVs, Go-Carts, and the like. The motorcycle remains largely unmodified, in riding condition and connected to the apparatus FIG. 1 by attaching it to the restraint bracket tube frame FIG. 5, FIG. 6, FIG. 10 and FIG. 11.

Figure 7:
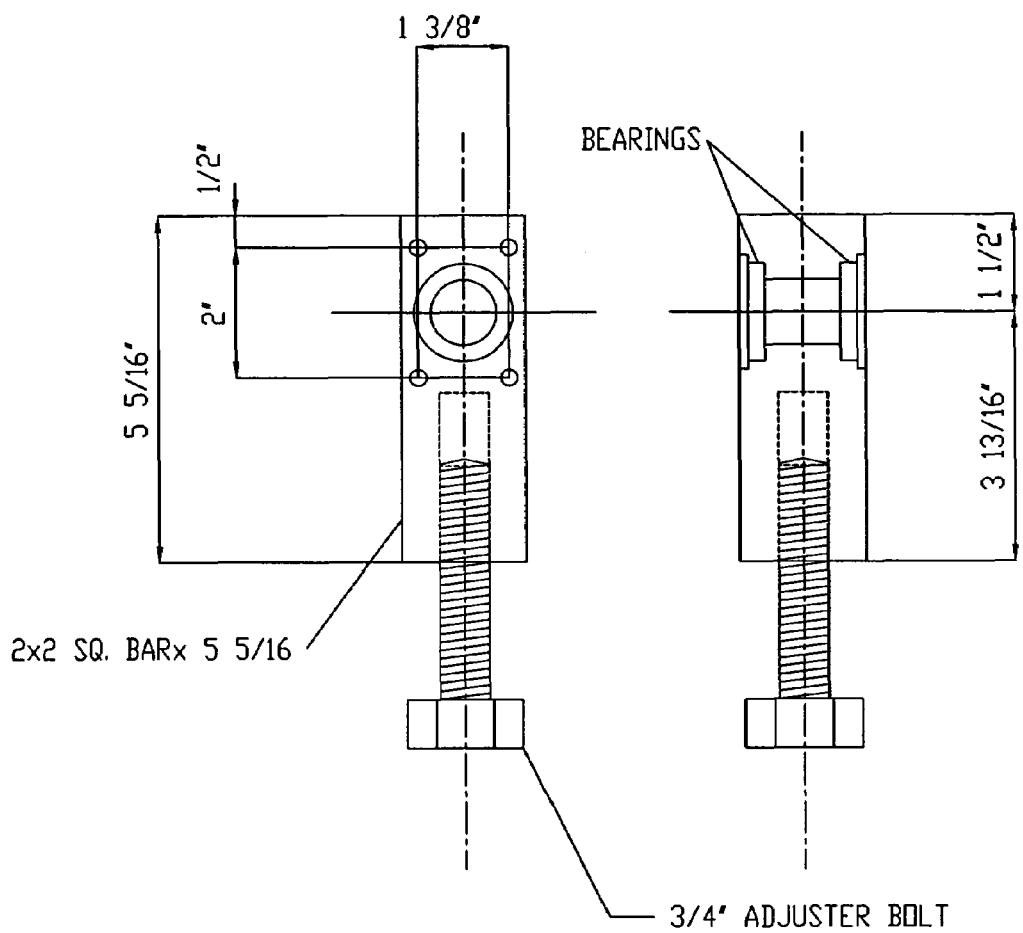
FIG. 7 is an elevational side-view illustration of the axle adjuster sleeve according to the present invention.
Figure 8:
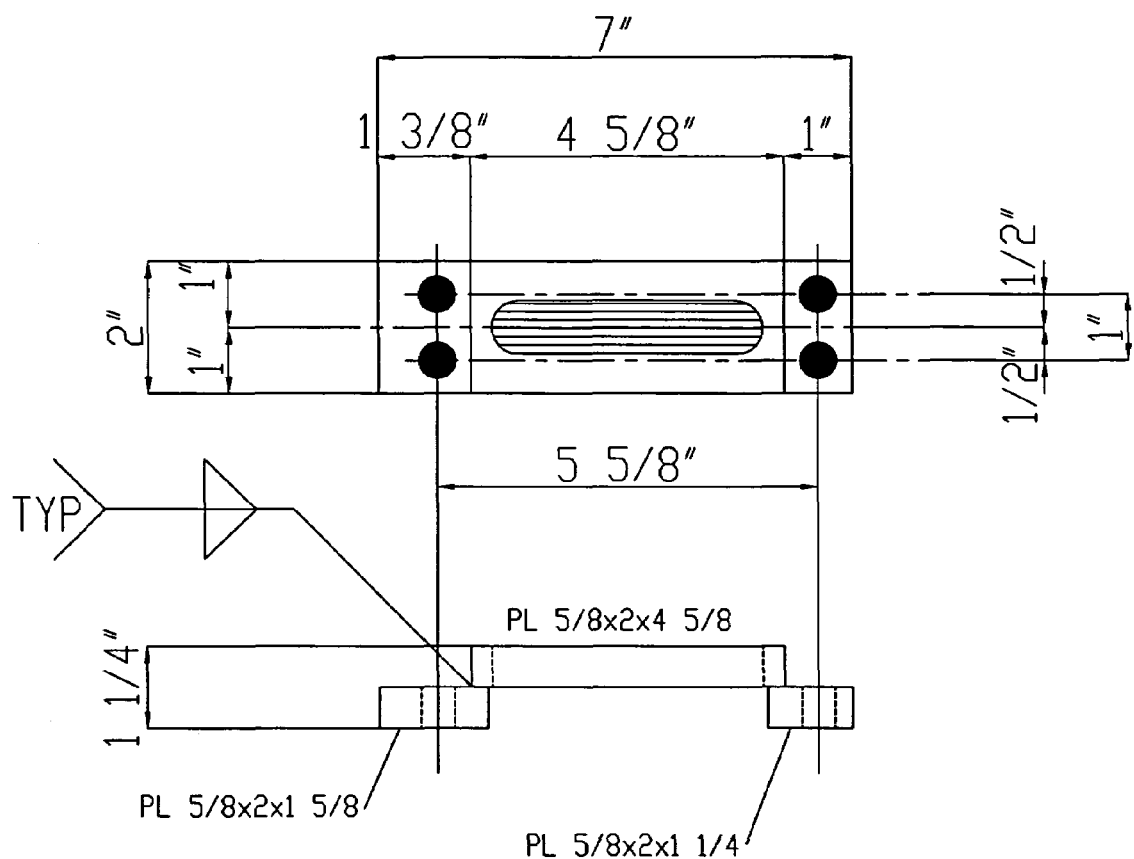
FIG. 8 is an elevational side-view illustration of the adjuster plates according to the present invention.

Pay attention to the unique design of the embodiment of the apparatus which is located in the center of the tube frame FIG. 5 and FIG. 7. When the bolt FIG. 5 and FIG. 7 is tightened, the axle adjuster sleeve FIG. 5, FIG. 7, FIG. 10 and the axle FIG. 5, FIG. 9 and FIG. 10 move downward at the same time as one unit on both sides of the motorcycle to create pressure between the tire and the dyno drum FIG. 5 and FIG. 10 creating enough friction so that a wheelie can take place.

When connected to the apparatus FIG. 1, the rear wheel of the motorcycle rests immediately above the road simulation means FIG. 1 which rotates under the rear wheel thus simulating actual road riding. There is sufficient friction between the rear wheel of the motorcycle and the road simulation means FIG. 1 to keep the rear wheel from slipping during operation.

Again, the road simulation means comprises an apparatus such as a 900 lb. Barrel that spins on two pivot points creating 100% balance under the rear wheel or front wheel of motorcycle for "popping a wheelie" or performing an "endo". As the gear mechanism FIG. 3 spins, this allows the "endo" to take place FIG. 3. Rear wheel slippage can result in the inability to perform a wheelie or premature termination of the ride. To this end, sufficient friction between the rear wheel and the road simulation means is both desirable and necessary.

Figure 10:
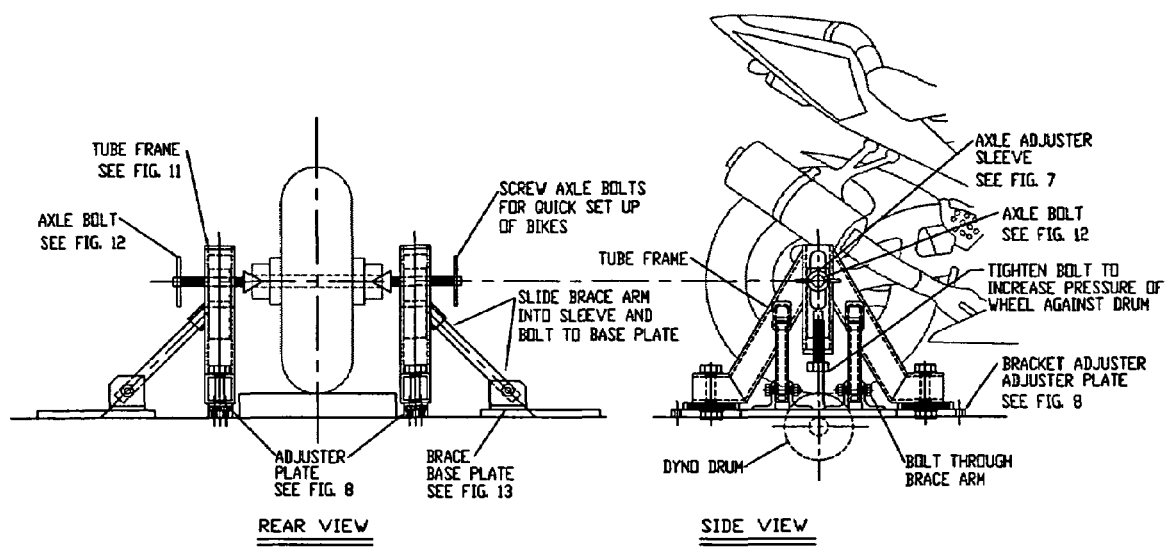
FIG. 10 is an elevational side-view and rear-view illustration of the bracket assembly according to the present invention.
Figure 11:
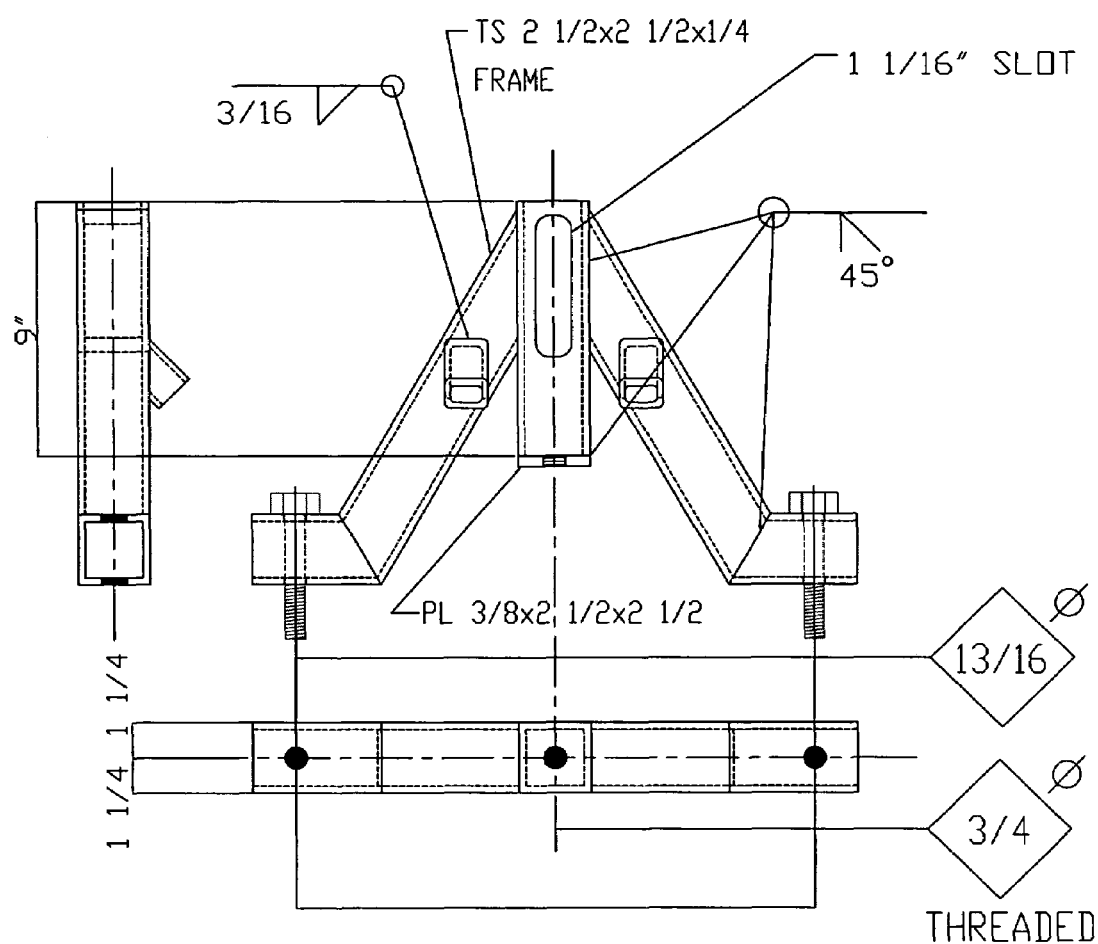
FIG. 11 is an elevational side-view illustration of the tube frame bracket according to the present invention.
Figure 13:
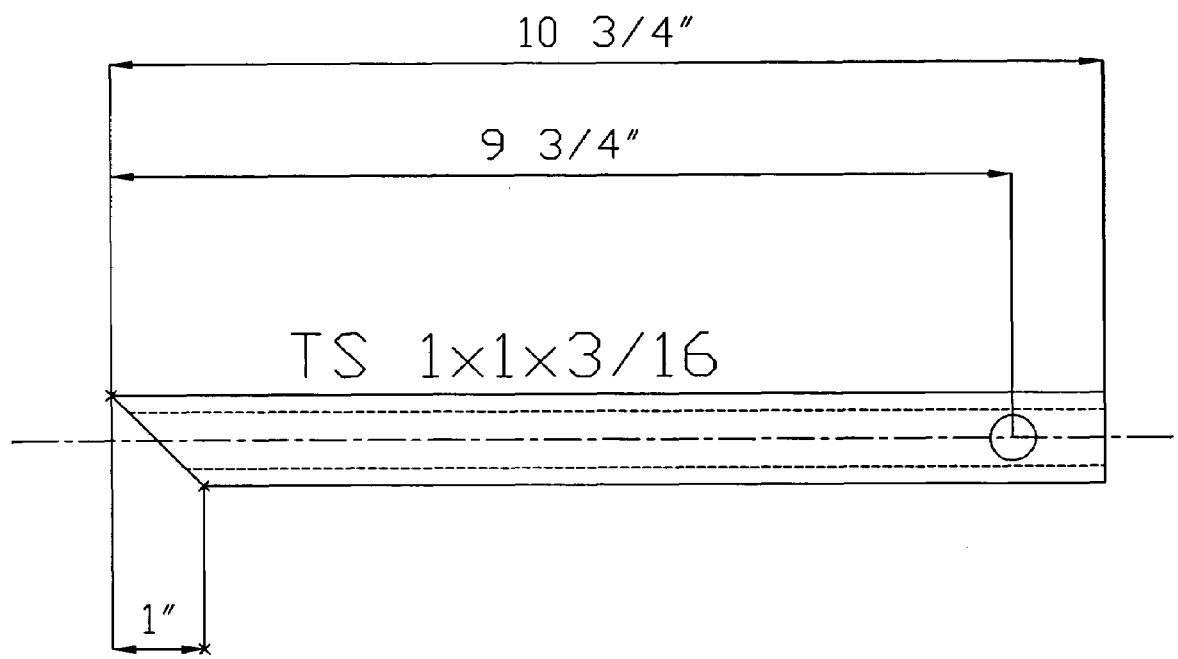
FIG. 13 is an elevational side-view illustration of the brace arm according to the present invention.
Figure 14:
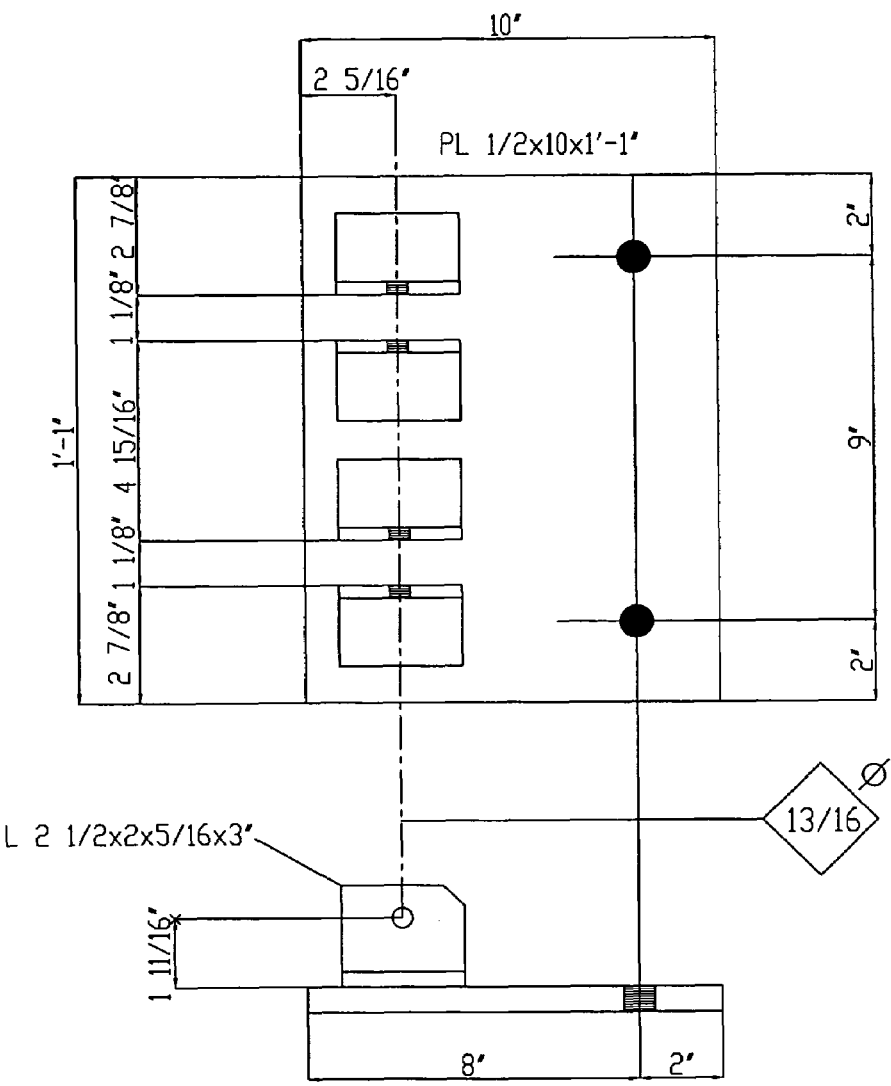
FIG. 14 is an elevational side-view illustration of the brace arm base plate according to the present invention.

The restraint bracket tube frame FIG. 5, FIG. 6 and FIG. 10 comprises a bracket retention means, a vertical bracket member FIG. 10, and a safety bolt through brace arm FIG. 13 and FIG. 14. The bracket retention means comprises of fixed or movable connection that imparts sufficient strength to the restraint bracket so as to keep the motorcycle from rolling onto one side or the other during operation. The fixed bracket retention means attach to the base of the apparatus or through the body of the apparatus and attach to an internal frame member. It is imperative that the location of attachment has sufficient structural strength to maintain the vertical position of the motorcycle when subjected to severe operating conditions.

The movable bracket retention means is pivotally attached to the apparatus and comprises an adjustable rigidity means. These adjustable rigidity means can be selectively adjusted to correspond to varying degrees or heights of difficulty or expertise. The adjustable rigidity means can comprise of springs, shocks, motors, hydraulics, or the like that are in electronic communication with the control unit so that the rigidity thereof can be adjusted.

The rear wheel can be attached to the vertical bracket member via nuts, bolts, pins, or any other means sufficient to provide adequate structural strength during operation. The safety bolt is of sufficient length to pass through the entire axle FIG. 9 of the rear wheel of the motorcycle and allow sufficient distance between the wheel and the vertical bracket member to allow the wheel to rotate freely without obstruction.

Figure 9:
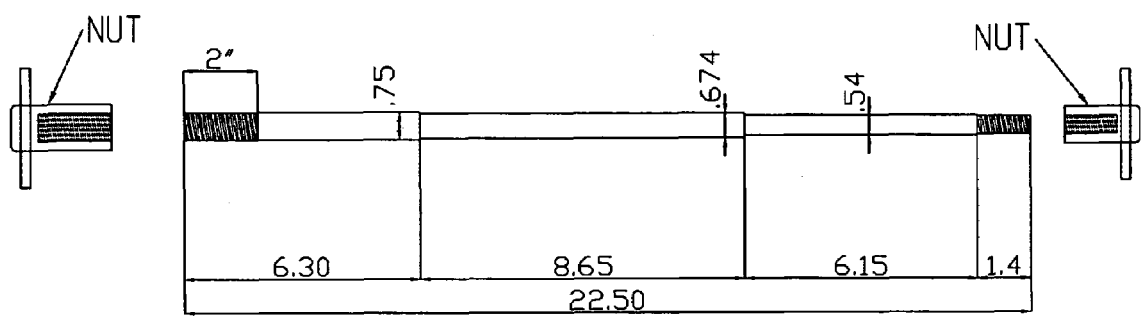
FIG. 9 is an elevational side-view illustration of the axle according to the present invention.

The safety bolt largely replaces the axle of the rear wheel and further comprises a series of retention nuts FIG. 9 that act to sufficiently attach the safety bolt and rear wheel to the swing-arm of the motorcycle.

Figure 12:
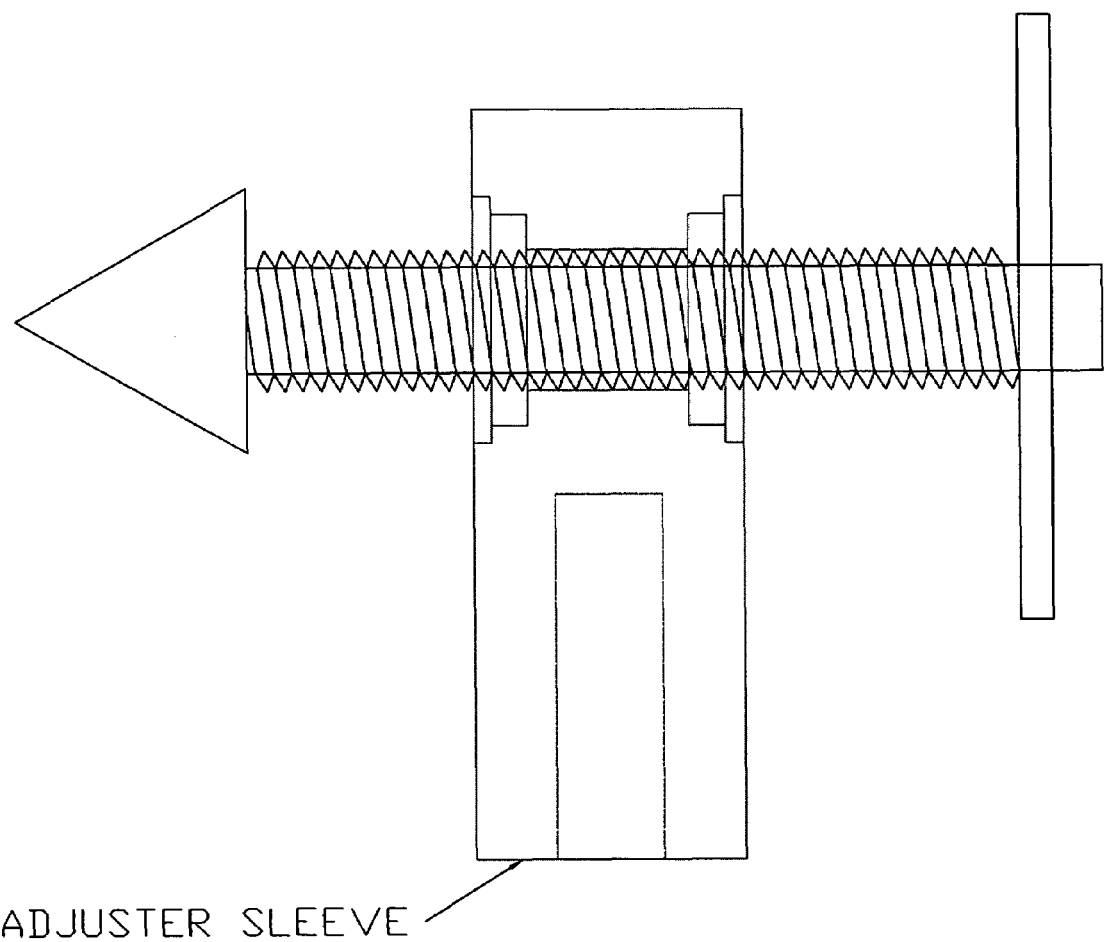
FIG. 12 is an elevational side-view illustration of the axle bolt and adjuster sleeve according to the present invention.

It will be appreciated by one skilled in the art that an additional retention bracket may be utilized on a side of the motorcycle opposite of the first retention bracket. Such a bracket is desirable to import additional structural support and strength to the apparatus as it is subjected to the stresses and strains of operation FIG. 10, FIG. 13 and FIG. 14. Every rider appreciates the convenience of switching from one motorcycle to another quickly FIG. 10 and FIG. 12. The axle bolt can thread in and out quickly to switch different motorcycles to tighten the rear wheel in place to secure the rear wheel of motorcycle on the road simulation (dynamometer wheel or drum).

Figure 4:
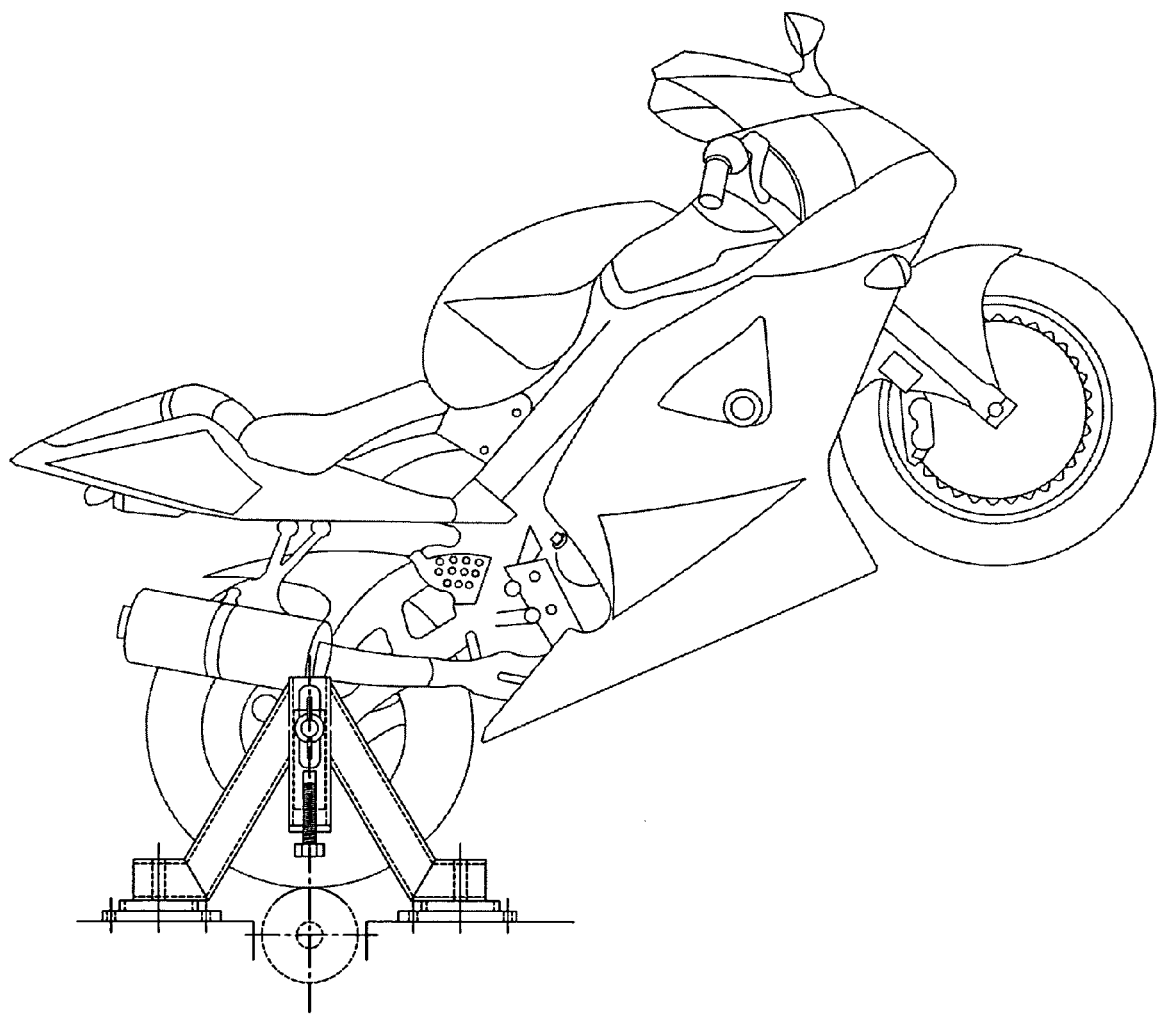
FIG. 4 is an elevational side-view illustration of the apparatus according to the present invention.

The road simulation means comprises an apparatus capable of simulating actual road condition. Such apparatus include dynamometer wheel or drum road simulation, or any other means sufficient to simulate road conditions. However, the intention is not to obtain legal protection on the road simulation means or of the motorcycle, but to protect the apparatus consisting of brackets and embodiments of brackets for a stationary wheelie to take place safely; FIG. 2, FIG. 3, FIG. 4. The road simulation apparatus can be in constant electronic communication with the control unit. The road simulation means has sufficient resistance and friction to facilitate the rider's performance of a wheelie FIG. 2 and FIG. 4.

The safety protection can include padding or airbags surrounding certain areas of the apparatus. The safety protection can also include nets for catching a rider in the event he or she is thrown from the apparatus. In addition, an optional harness (not shown) can be utilized to attach the rider to the motorcycle, or can be attached to the ceiling or other means to keep the rider from falling to the ground. Such safety measures can prevent injury to both riders and bystanders. It can be appreciated by anyone that further personal safety protection can be included. Such personal safety protection non-exclusively includes: helmet; gloves; boots; and other various body protection items, such as a harness attached by a bracket attached to the motorcycle, pads for the arms, shoulders, neck, back, and legs.

The apparatus further includes a failsafe mechanism frame saver. Illustratively, clearly shown on FIG. 1, FIG. 16, FIG. 17, FIG. 18, FIG. 19, FIG. 20, FIG. 21, FIG. 22. The first sensor comprises a roll sensor and sends an electronic signal to the control unit corresponding to a lateral measurement in relation to the absolute vertical position of the rear wheel. Should the lateral measurement of the rear wheel exceed a pre-determined range (generally, about 15 to 20 degrees), the adjustable rigidity means will adjust accordingly to bring the rear wheel to a substantially vertical position.

The second sensor is in electronic communication with the control unit and sends an electronic signal corresponding to the motorcycle's angle of attack. Should the motorcycle exceed a pre-determined angle of attack (generally, about 90 degrees), the control unit will send a signal to the road simulation means to reduce resistance against the rear wheel thus keeping the motorcycle from flipping over backwards.

The control unit comprises a processor and is in electronic communication with all sensors and simulation apparatus sending electronic signals thereto and receiving electronic signals therefrom maintaining the appropriate operating condition for each rider.

The control unit can also be in electronic communication with the motorcycle so as to control its operating conditions. For example, the control unit can send an electronic signal to a throttle governor (not shown) to keep the engine from exceeding a predetermined resolution per minute (RPM) or exceeding a predetermined speed. The control unit can also be used to totally control the motorcycle for riders unable to control the motorcycle themselves.

In another embodiment, restraint bracket is a universal bracket FIG. 10, that can accommodate nearly any motorcycle off the street. Riders can bring their own motorcycles to the ride, attach the appropriate means such as restraint bracket, roll sensor angle of attack sensor, exhaust vent system and safety protection, and perform a wheelie. In a still further embodiment, the restraint bracket is motorcycle specific and removably attached to the road simulation means as to be interchangeable with each different motorcycle used. For example, the restraint bracket is removably attached to the road simulation means utilize, a removable pin or any other means that facilities quick and easy release of the bracket FIG. 10.

In a further embodiment, a video screen FIG. 1, FIG. 2, FIG. 3 may be utilized to further enhance the experience of the simulation. Such video screen can project images emulating on road conditions, off road conditions, and the like. Other conditions such as wind, rain, snow, or the like can be artificially created by additional means such as fans, sprinklers, snowmakers, or the like (not shown) to create realistic driving conditions FIG. 1, FIG. 2 and FIG. 3.

The method of performing a stationary wheelie begins with a rider mounting the motorcycle. The engine motorcycle is started by the rider or a person utilizing the control unit. The motorcycle is put into gear by the rider or otherwise and the throttle is increased. As the throttle is increased resistance is applied by the road simulation means sufficient to cause the front wheel of the motorcycle off the apparatus and pivot the motorcycle about the rear axle of the rear wheel.

Figure 15:
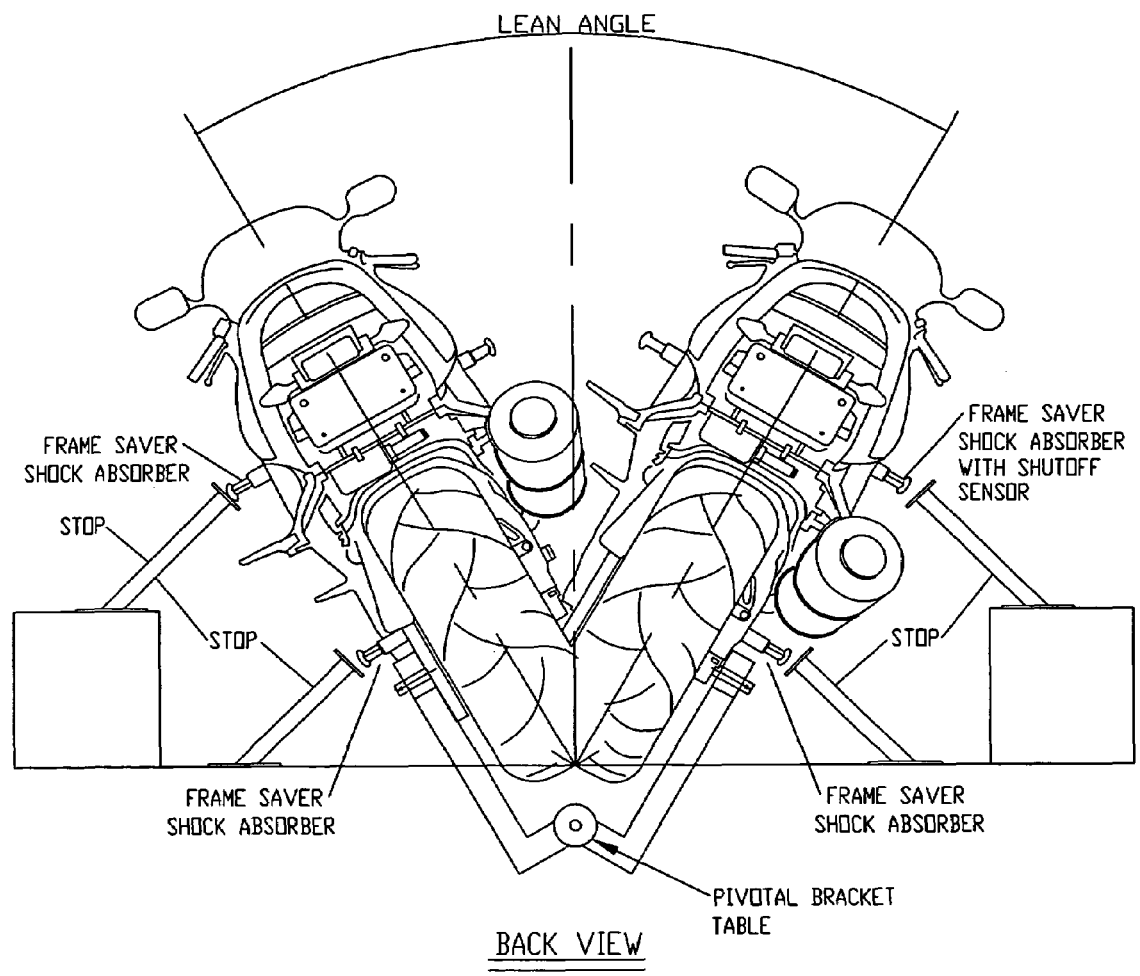
FIG. 15 is an elevational rear-view illustration of the apparatus according to the present invention.
Figure 16:
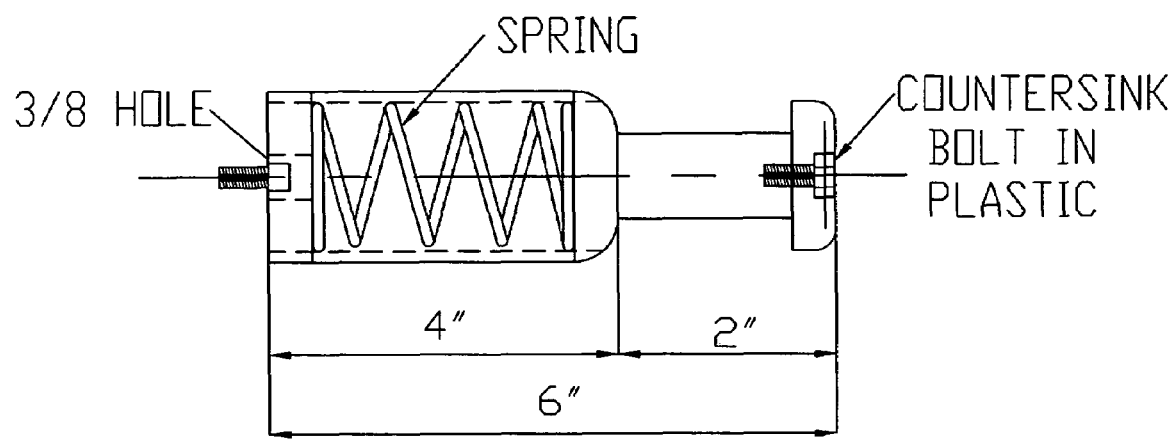
FIG. 16 is an elevational side-view illustration of the frame saver failsafe mechanism according to the present invention.
Figure 17:
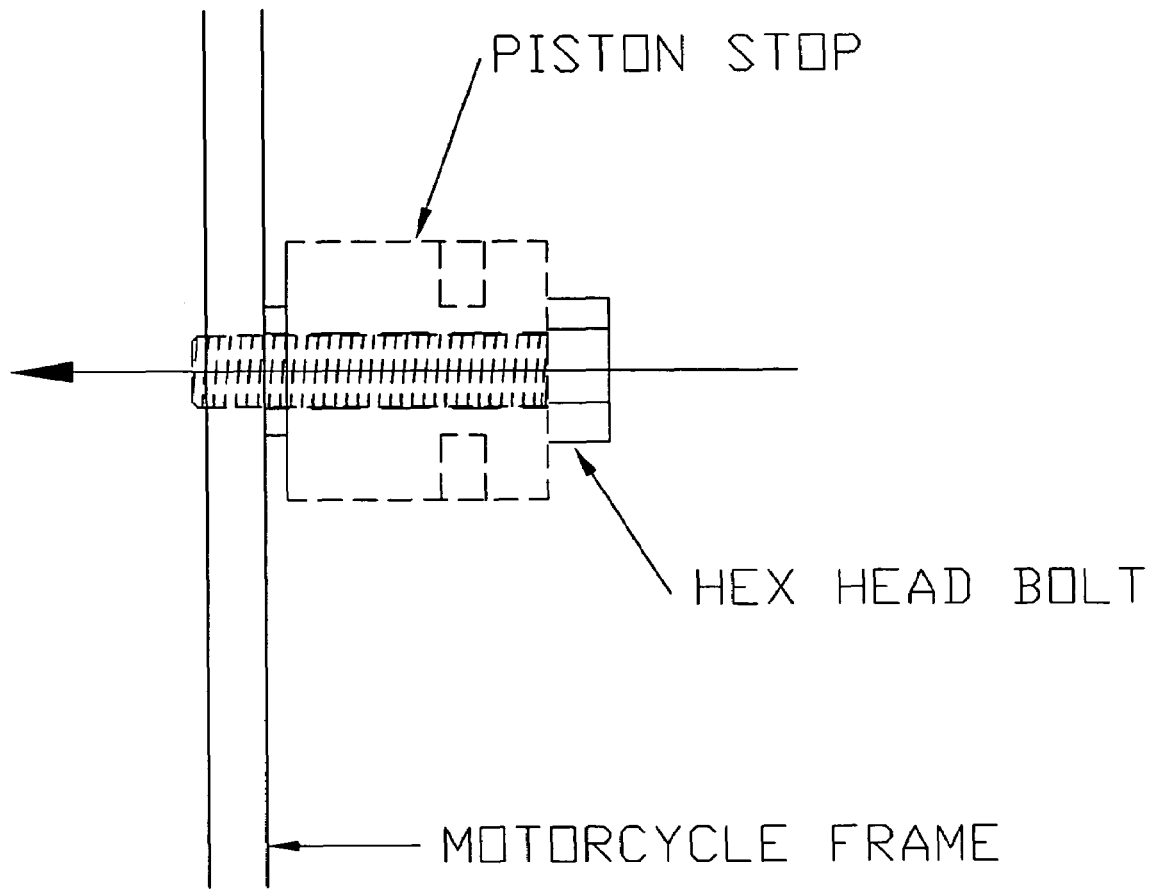
FIG. 17 is an elevational side-view illustration of the frame saver failsafe mechanism attached to the motorcycle frame according to the present invention.
Figure 18:
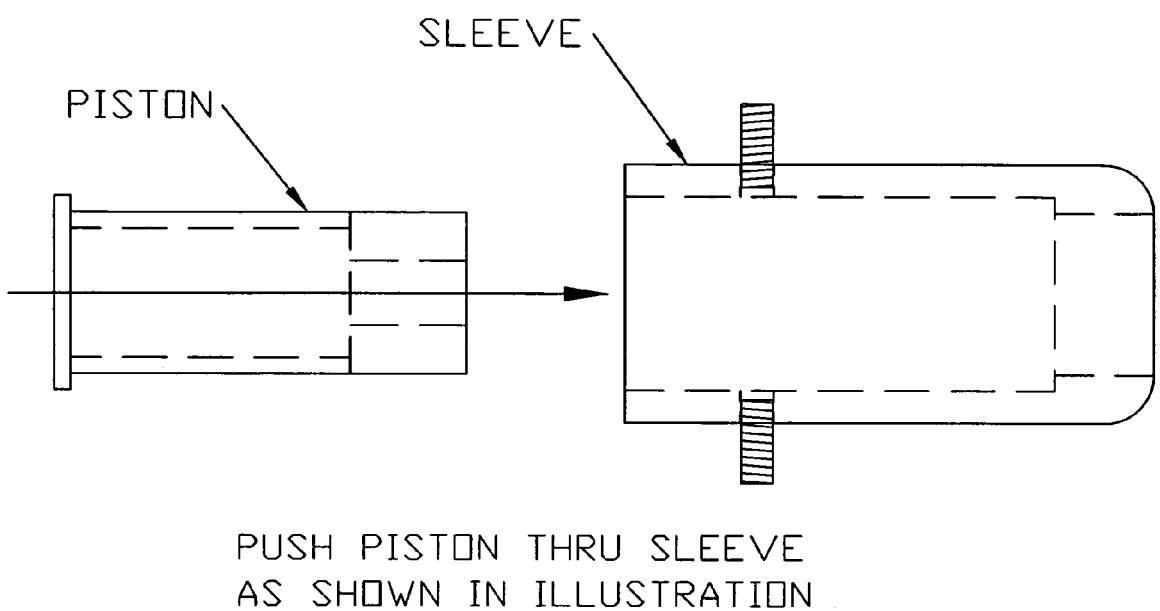
FIG. 18 is an elevational side-view illustration of the frame saver failsafe mechanism piston and sleeve according to the present invention.
Figure 19:
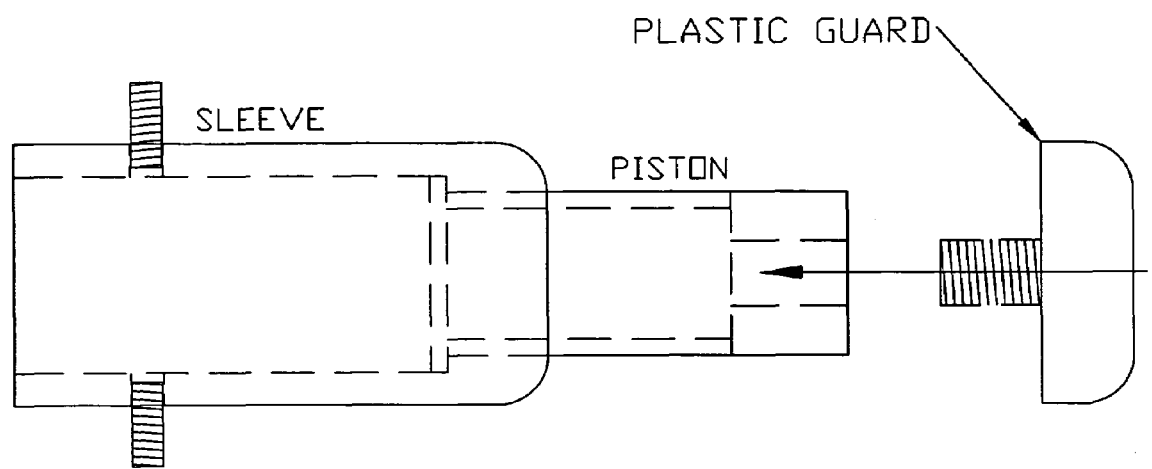
FIG. 19 is an elevational side-view illustration of the frame saver failsafe mechanism assembled with the plastic guard according to the present invention.
Figure 20:
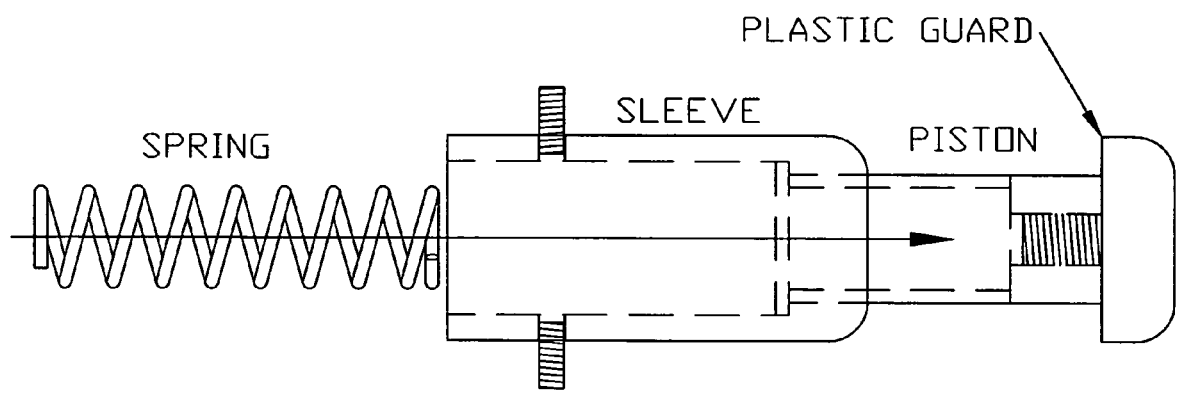
FIG. 20 is an elevational side-view illustration of the frame saver failsafe mechanism assembled with a spring driving the piston.
Figure 21:
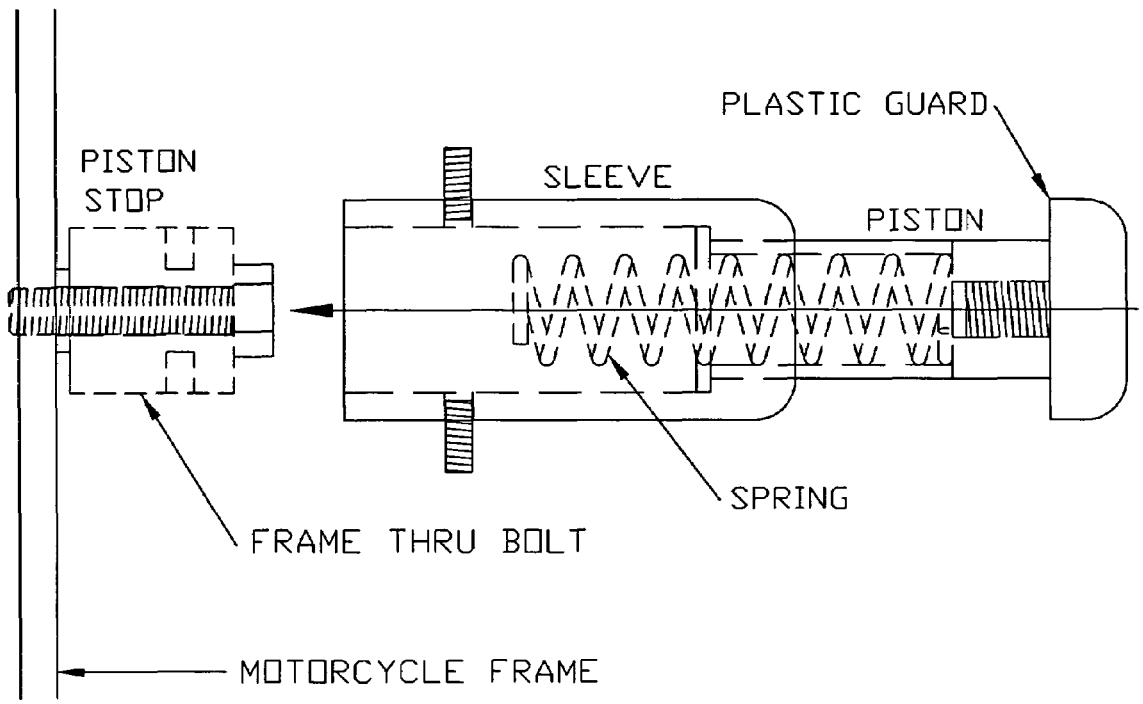
FIG. 21 is an elevational side-view illustration of the frame saver failsafe mechanism assembled with a piston stop.
Figure 22:
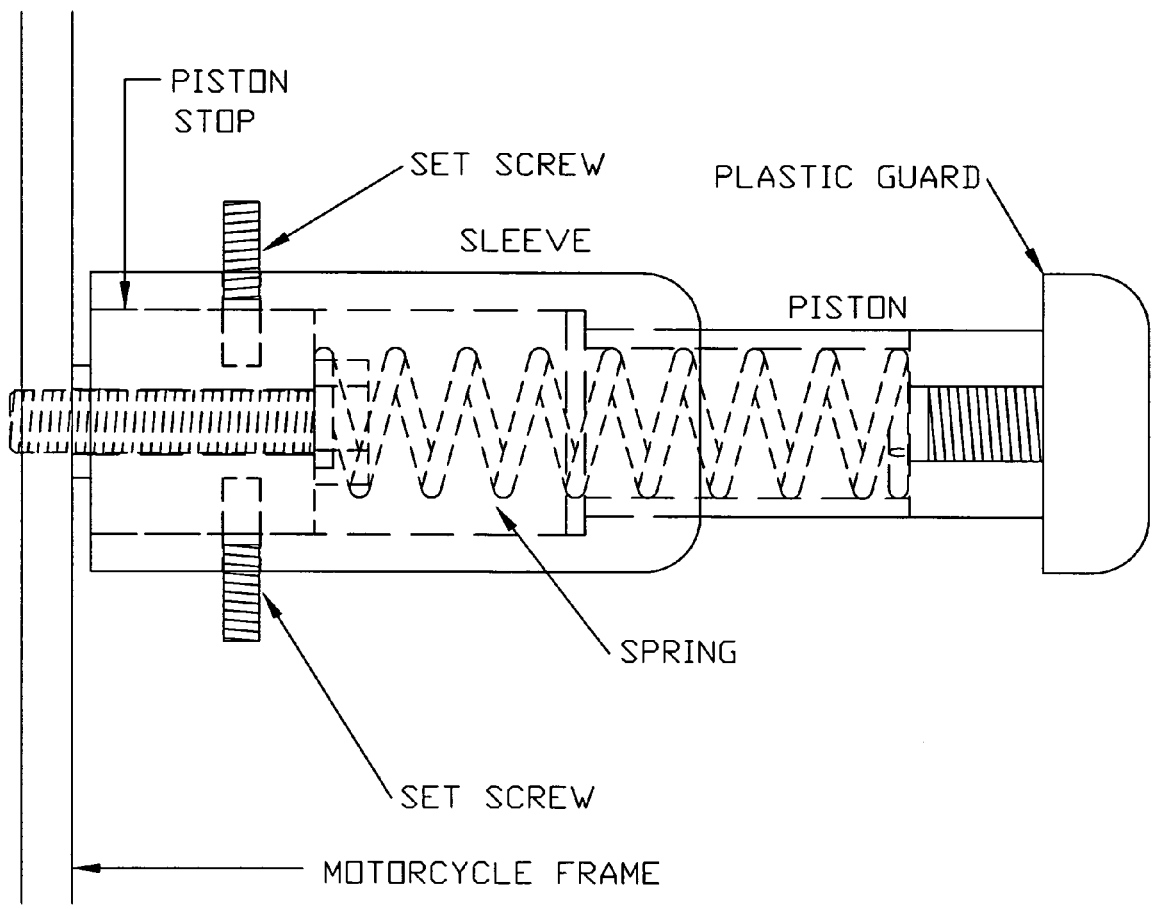
FIG. 22 is an elevational side-view illustration of the frame saver failsafe mechanism as completely assembled.

The rider is first protected by a failsafe mechanism which prevents the motorcycle from rolling onto one side or another FIG. 1, FIG. 15 and further prevents the motorcycle from flipping over backwards. The rider is further protected by safety protection such as padding and netting to prevent the rider from injury in the event he or she falls from the apparatus.

Figure 23:
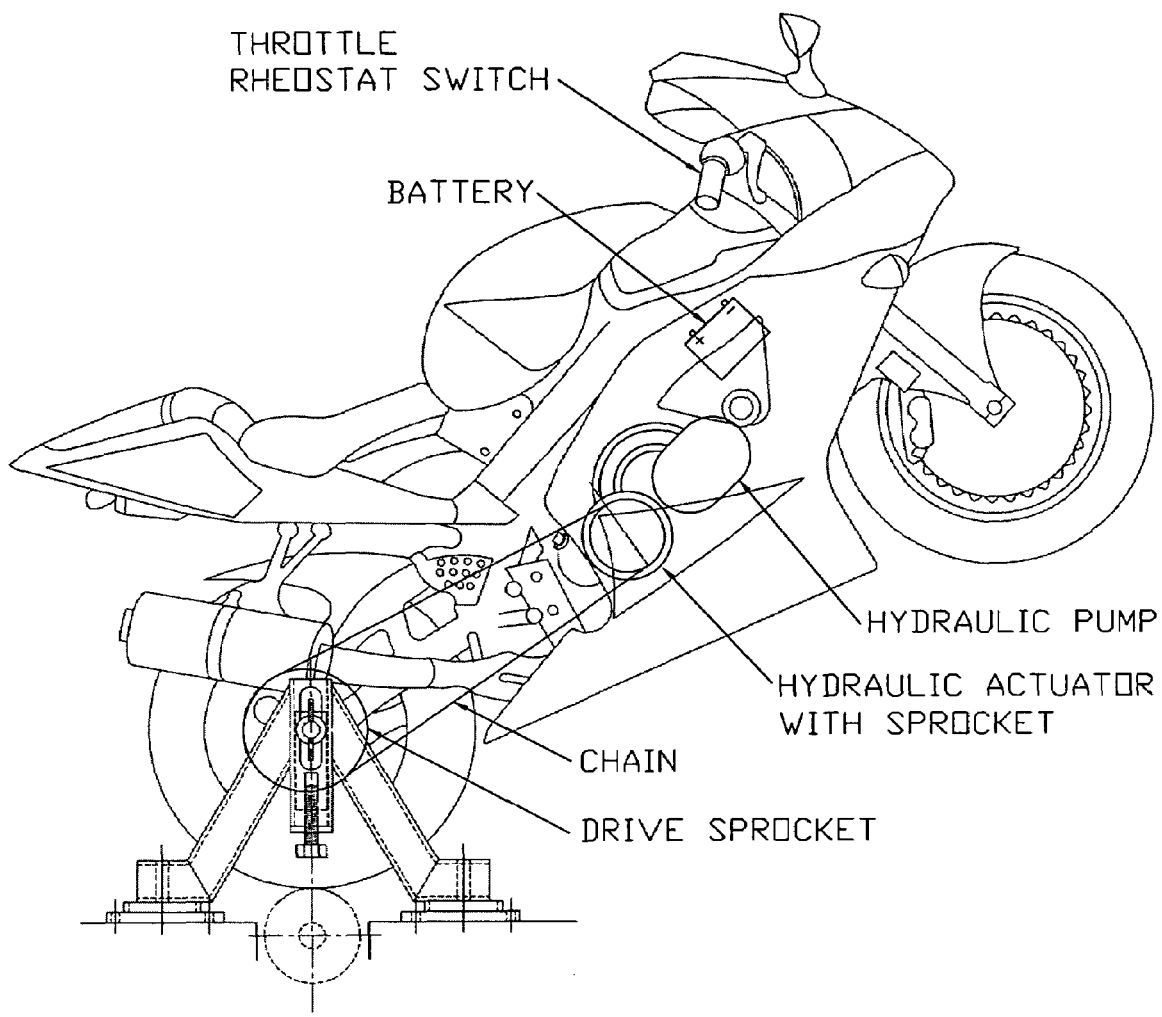
FIG. 23 is an elevational side-view illustration apparatus using hydraulic components according to the present invention.
Figure 24:
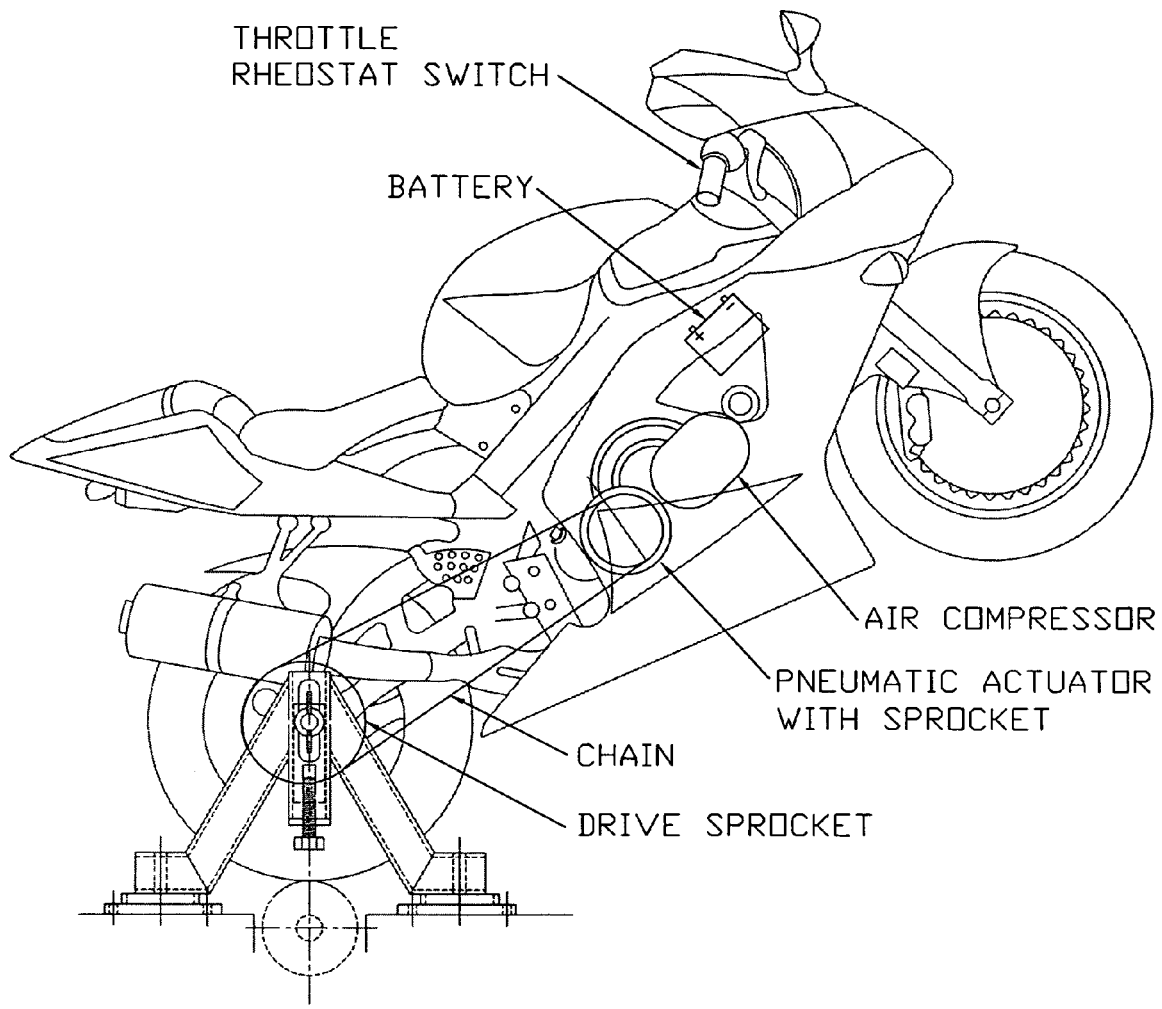
FIG. 24 is an elevational side-view illustration apparatus using pneumatic components according to the present invention.
Figure 25:
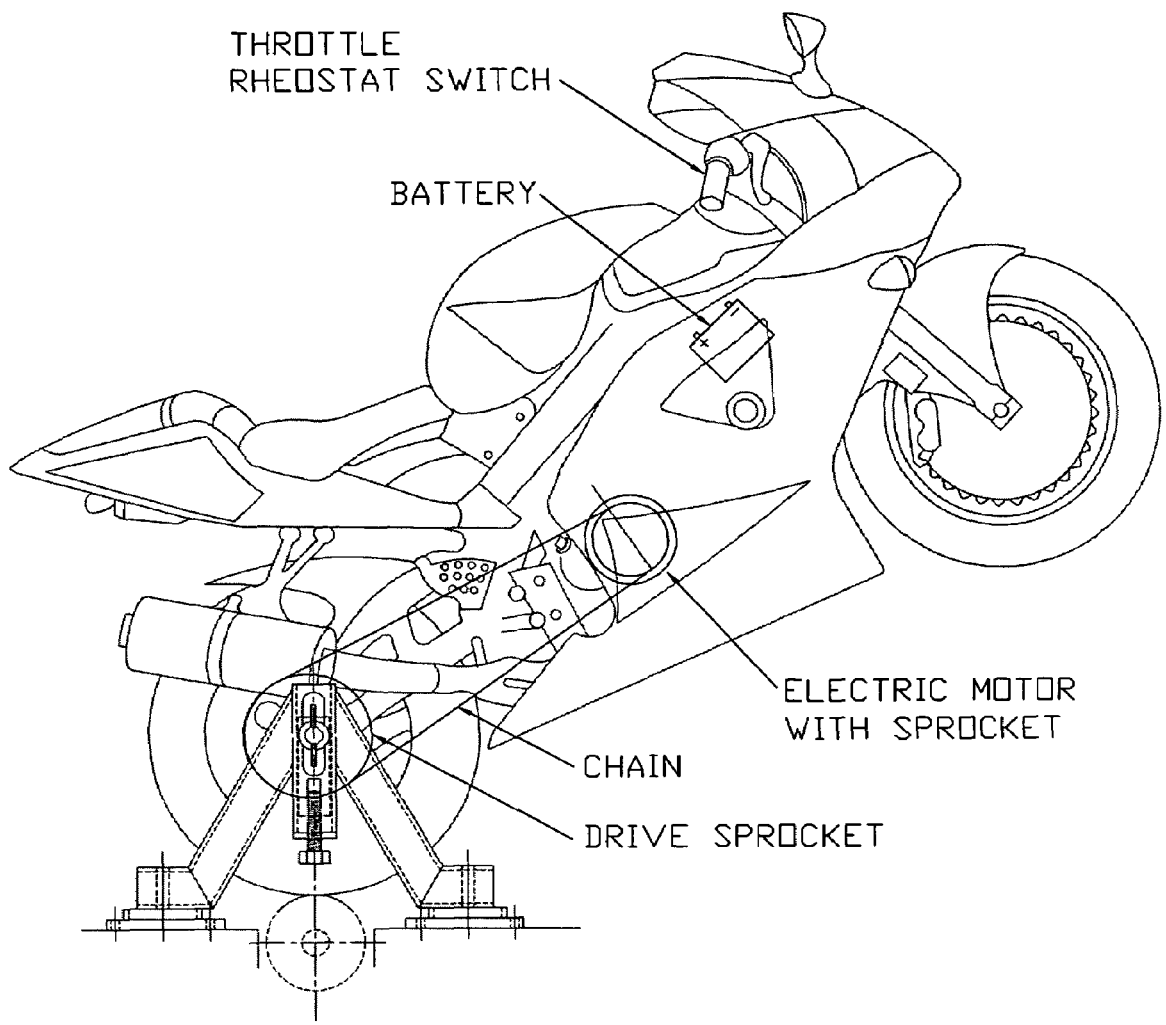
FIG. 25 is an elevational side-view illustration apparatus using electric components according to the present invention".

In another alternative method, the motorcycle is mounted to a bracket and has a pivot position located substantially concentrical to the axle of the rear-wheel. A hydraulic, pneumatic, or electric motor FIG. 23, FIG. 24, FIG. 25 is in electronic communication with the throttle control and operates a lifting mechanism attached to the bottom of the bracket. As the rider applies (i.e., increases) throttle the motor is activated and the motorcycle on the bracket simulates a wheelie while the rear-wheel remains on the ground. The more throttle applied, the greater angle of attack.

Inasmuch as the preceding disclosure presents the best mode devised by the inventor for practicing the invention and is intended to enable one skilled in the pertinent art to carry it out, it is apparent that methods incorporating modifications and variations will be obvious to those skilled in the art. As such, it should not be construed to be limited thereby but should include such aforementioned obvious variations and be limited only by the spirit and scope of the following claim.

Every rider appreciates the convenience of switching from one motorcycle to another quickly FIG. 10. The axle bolt can thread in and out quickly to switch different motorcycles to tighten the rear wheel in place to secure the rear wheel of motorcycle on the road simulation (dynamometer wheel or drum).

However, the intention is not to obtain legal protection on the road simulation means or of the motorcycle, but to protect the apparatus consisting of brackets and embodiments of brackets for a stationary wheelie to take place safely; FIG. 4, FIG. 5, FIG. 10.

I claim:

1. A motorcycle wheelie simulator apparatus comprising:
   an operative motorcycle;
   a restraint bracket tube;
   a road simulation means;
   a failsafe mechanism;
   a control unit in electrical communication with sensors positioned in the apparatus to monitor safe riding conditions;
   wherein said operative motorcycle is interchangeable;
   wherein said restraint bracket tube is operably connected to a wheel of said operative motorcycle by a bracket retention means, a vertical bracket member, and a safety bolt-through brace arm;
   wherein said bracket retention means comprises bolts and an axle adjustor sleeve;
   wherein said road simulation means is selected from a group consisting of: a dynamometer wheel, and a spinning drum;
   wherein said failsafe mechanism is connected to said operative motorcycle in a manner preventing the operative motorcycle from rolling or tipping;
   wherein said control unit comprises a processor monitoring a lateral angle of the operative motorcycle wheel relative to absolute vertical and the operative motorcycle's vertical angle relative to the road simulation means.

2. The motorcycle wheelie simulator apparatus of claim 1 wherein said operative motorcycle is selected from a group consisting of a sport bike, a cruiser, a touring motorcycle, a standard motorcycle, a chopper, a dual-sport motorcycle, an enduro motorcycle, a dirt bike, a mini bike, a three-wheeler, a four-wheeler, and a go-cart.

3. The motorcycle wheelie simulator apparatus of claim 1 wherein said bracket retention means comprises an adjustable rigidity means comprising any one of the group consisting of springs, shocks, motors, and hydraulics.

4. The motorcycle wheelie simulator apparatus of claim 3 wherein said adjustable rigidity means is manipulated by said control unit.

5. The motorcycle wheelie simulator apparatus of claim 1 wherein an exhaust venting system vents exhaust gasses away from the operator.

6. The motorcycle wheelie simulator apparatus of claim 1 wherein said restraint bracket tube is connected to a rear-facing portion of said operative motorcycle.

7. The motorcycle wheelie simulator apparatus of claim 1 wherein said restraint bracket tube is connected to a front-facing portion of said operative motorcycle.

8. A motorcycle wheelie simulator system comprising:
an operative motorcycle;
a restraint bracket tube;
a road simulation means;
a failsafe mechanism;
a control unit in electrical communication with sensors positioned in the apparatus to monitor safe riding conditions;
wherein said operative motorcycle is interchangeable;
wherein said restraint bracket tube is operably connected to a wheel of said operative motorcycle by a bracket retention means, a vertical bracket member, and a safety bolt-through brace arm;
wherein said bracket retention means comprises bolts and an axle adjustor sleeve;
wherein said road simulation means is selected from a group consisting of: a dynamometer wheel, and a spinning drum;
wherein said failsafe mechanism is connected to said motorcycle in a manner preventing the operative motorcycle from rolling or tipping;
wherein said control unit comprises a processor monitoring a lateral angle of the operative motorcycle wheel relative to absolute vertical and the operative motorcycle's vertical angle relative to the road simulation means;
wherein said operative motorcycle is positioned on said road simulation means whereby said operative motorcycle is caused to tip a wheel up as a result of friction between said operative motorcycle and said road simulation means when a motorcycle throttle, clutch, or brake is manipulated singly or in combination by an operator to perform a wheelie.

9. The motorcycle wheelie simulator system of claim 8 wherein said operative motorcycle is selected from the group consisting of: a sport bike, a cruiser, a touring motorcycle, a standard motorcycle, a chopper, a dual-sport motorcycle, an enduro motorcycle, a dirt bike, a mini bike, a three-wheeler, a four-wheeler, and a go-cart.

10. The motorcycle wheelie simulator system of claim 8 wherein said bracket retention means comprises an adjustable rigidity means comprising any one of the group consisting of springs, shocks, motors, and hydraulics.

11. The motorcycle wheelie simulator system of claim 10 wherein said adjustable rigidity means is manipulated by said control unit.

12. The motorcycle wheelie simulator system of claim 8 wherein an exhaust venting system vents exhaust gasses away from the operator.

13. The motorcycle wheelie simulator system of claim 8 wherein if said lateral angle is outside an angle of 15 to 20 degrees laterally or said vertical angle is past about 90 degrees vertically, preventing the operative motorcycle from tipping and rolling by employing a failsafe mechanism.

14. A method for simulating a motorcycle wheelie comprising:
interchangeably attaching a street ridable motorcycle to a restraint bracket tube;
positioning said motorcycle on a road simulation means;
monitoring by a control unit, the lateral angle of the street ridable motorcycle wheel relative to absolute vertical and the street ridable motorcycle's vertical angle relative to the road simulation means;
wherein if said lateral angle is outside an angle of 15 to 20 degrees laterally or said vertical angle is past about 90 degrees vertically, preventing the street ridable motorcycle from tipping or rolling by employing a failsafe mechanism;
wherein said street ridable motorcycle is caused to tip a wheel into the air as a result of friction between said street ridable motorcycle and said road simulation means when a street ridable motorcycle throttle, clutch, or brake is manipulated singly or in combination by an operator to perform a wheelie.

15. The method of claim 14 wherein interchangeably attaching said street ridable motorcycle is any vehicle from the group consisting of a sport bike, a cruiser, a touring motorcycle, a standard motorcycle, a chopper, a dual-sport motorcycle, an enduro motorcycle, a dirt bike, a mini bike, a three-wheeler, a four-wheeler, and a go-cart.

16. The method of claim 15 wherein said restraint bracket tube comprises an adjustable rigidity means consisting of installing any one of the group of springs, shocks, motors, or hydraulics.

17. The method of claim 16 wherein the control unit adjusts the adjustable rigidity means.

18. The method claim 14 wherein venting exhaust vents exhaust gasses away from an operator.

19. The method of claim 14 further comprising the step of connecting said restraint bracket tube to a rear-facing portion of said street ridable motorcycle.

20. The method of claim 14 further comprising the step of connecting said restraint bracket tube to a front-facing portion of said street ridable motorcycle.

* * * * *